Oct. 18, 1960 L. A. DEVER 2,956,452
INDEXING MECHANISM
Filed Dec. 19, 1958 2 Sheets-Sheet 1
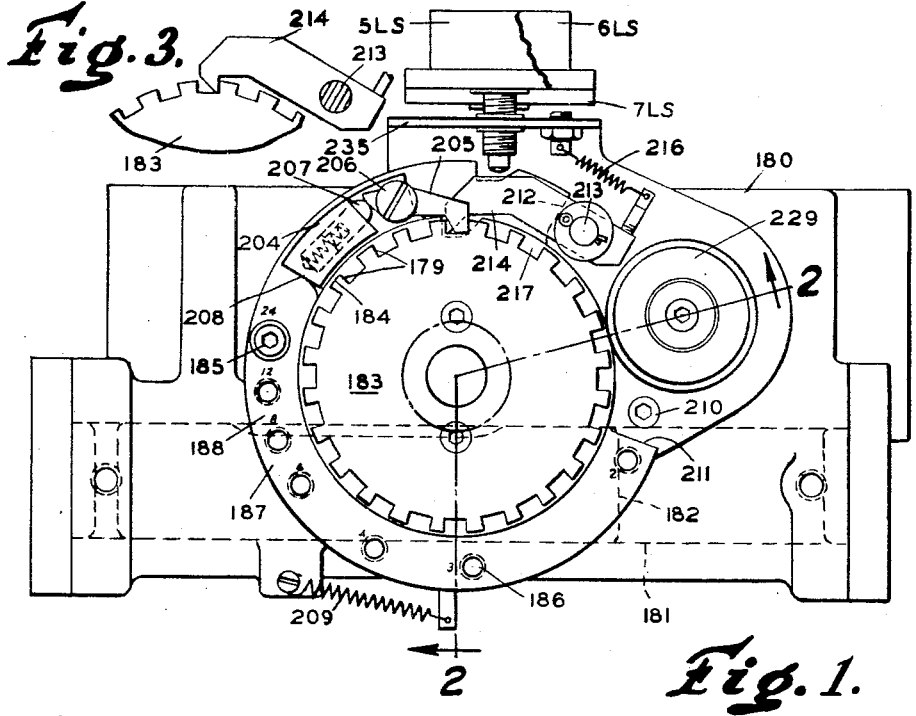
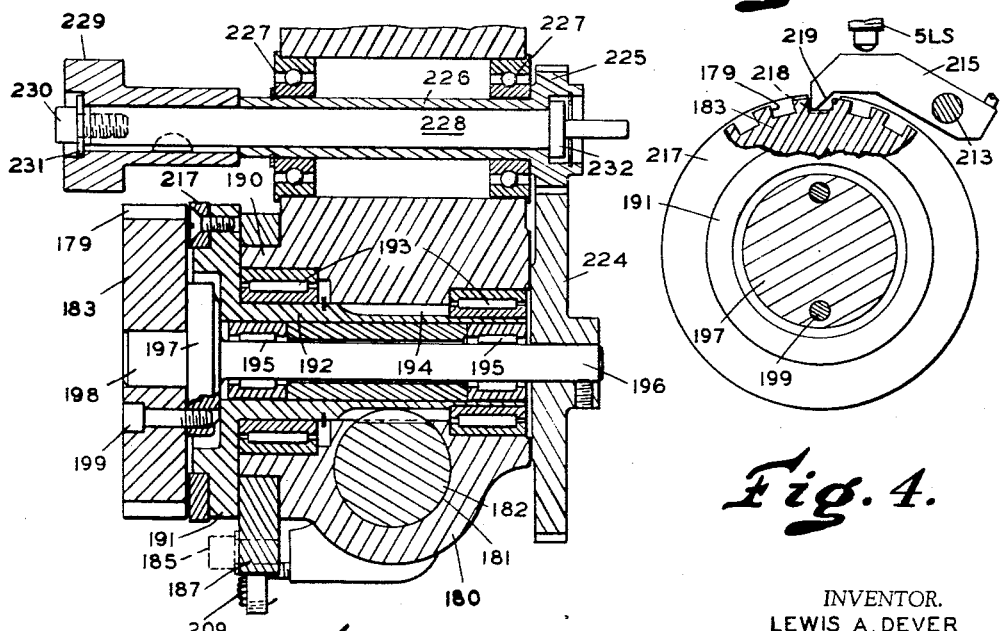
INVENTOR.
LEWIS A. DEVER
BY
ATTORNEYS

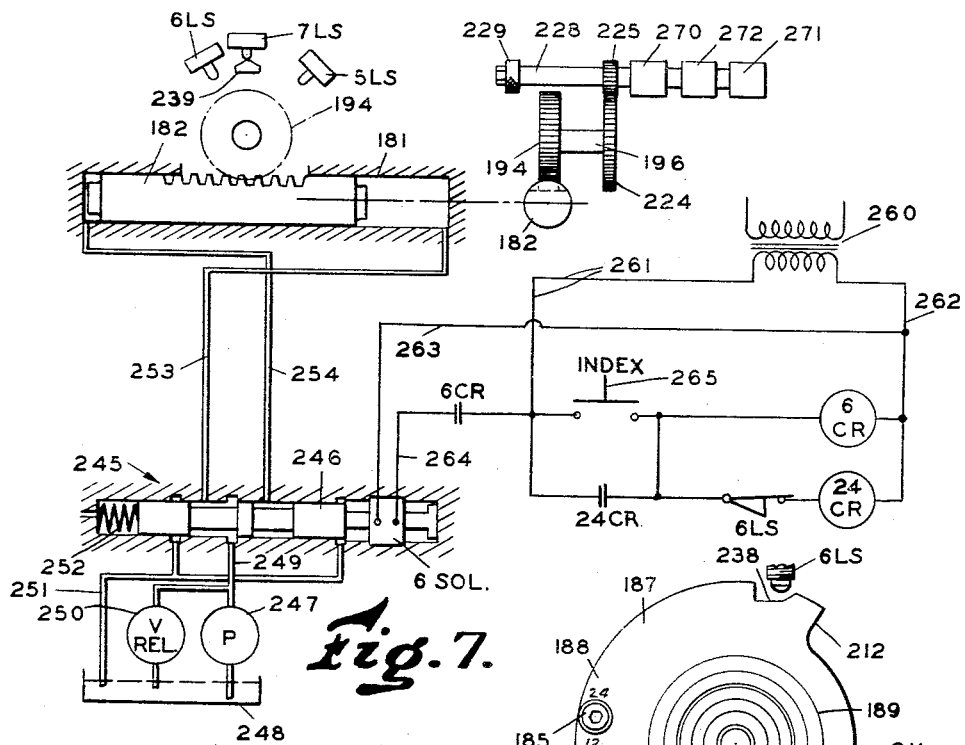
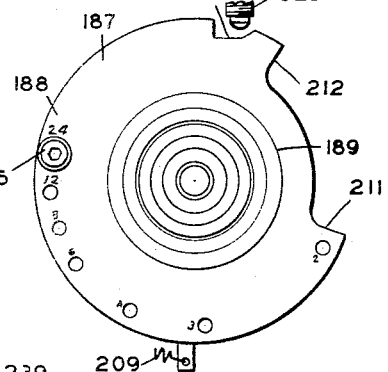
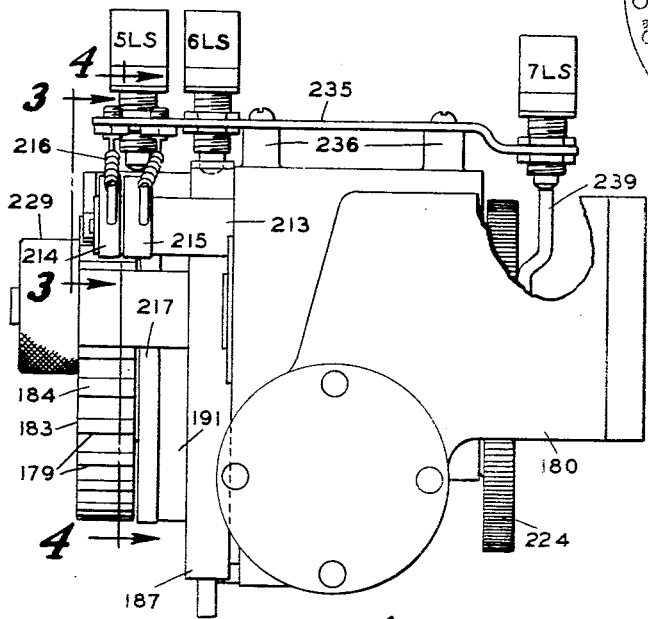
Fig. 7.
Fig. 6.
Fig. 5.
INVENTOR.
LEWIS A. DEVER ically operable device for giving a rotatable member equal steps of angular movement in a positive and precise manner. The device is of simple but rugged construction and will provide precision indexing of a shaft or other rotatable member with a minimum amount of attention and care.

United States Patent Office 2,956,452
Patented Oct. 18, 1960

2,956,452
INDEXING MECHANISM

Lewis A. Dever, Cincinnati, Ohio, assignor to The Cincinnati Milling Machine Co., Cincinnati, Ohio, a corporation of Ohio Filed Dec. 19, 1958, Ser. No. 781,748

4 Claims. (Cl. 74—822)

This invention relates to a selectively operable device for giving a rotatable member equal steps of angular movement in a positive and precise manner. The device is of simple but rugged construction and will provide precision indexing of a shaft or other rotatable member with a minimum amount of attention and care.

In the present device, the equal steps of indexing movement are controlled by an indexing disc having a number of equally spaced teeth distributed about its periphery. Indexing movement of the disc is effected by an actuator which is adapted to be given reciprocating movement and thereby oscillate a driving element through a forward and return stroke. The stroke of the driving element is selectively adjustable so as to cause the indexing disc to be advanced a predetermined number of teeth on each cycle of operation of the actuator. The precision of the indexing movement is determined by the accurate spacing between corresponding surfaces on each of the teeth of the indexing disc. Hence, it is possible to obtain very precise indexing movements of the disc by simply maintaining the spacing between corresponding surfaces of the indexing teeth to a suitable small tolerance. This is readily possible by present day machining operations and poses no particular problem insofar as the manufacture of the disc is concerned.

Means is also provided in the present indexing mechanism for preventing the initiation of the backward stroke of the driving element until the forward stroke thereof has been completed. In this way it is insured that the disc will be advanced the required number of teeth on each indexing cycle and inadvertent short strokes of the mechanism which would result in faulty indexing will be prevented.

It is therefore an object of the present invention to provide an indexing mechanism which is simple in construction and reliable in operation.

Another object of the invention is to provide an indexing mechanism for selectively advancing a rotatable member through equal steps of angular movement with a high degree of certainty and precision.

Another object of the invention is to provide a cyclically operable indexing mechanism having a forward stroke followed by a return stroke with means for preventing the initiation of the return stroke until the forward stroke has been completed.

The means whereby these and other objects are obtained will now be described, it being understood that the invention includes certain novel featuers of construction and combinations of parts, the essential elements of which are set forth in the appended claims, and a preferred form or embodiment of which will hereinafter be described with reference to the drawings which accompany and form a part of this specification.

In the drawings:

Fig. 1 is a front elevation of the indexing mechanism showing the indexing disc and the driving, holding and positioning pawls associated therewith.

Fig. 2 is a cross-sectional view taken along the line 2—2 in Fig. 1.

Fig. 3 is a fragmentary view of the indexing mechanism looking along the line 3—3 in Fig. 5.

Fig. 4 is a cross-sectional view taken along the line 4—4 in Fig. 5.

Fig. 5 is a side elevation of the indexing mechanism.

Fig. 6 is a view showing a detail of the indexing mechanism.

Fig. 7 is a combined hydraulic and electrical diagram for illustrating the operation of the device.

In this specification, similar reference characters designates similar or identical elements and portions throughout the specification and throughout the different views of the drawings.

As shown in Figs. 1, 2, and 5 of the drawings, the indexing mechanism includes a frame casting 180 provided with a cylindrical bore 181 containing a rack piston 182 which is adapted for reciprocation within the cylinder to actuate the indexing mechanism. The mechanism also includes an indexing disc 183 which contains, in the present embodiment of the invention, twenty-four square teeth 184 equally spaced about its periphery. Hence, each time the disc is advanced a distance of one tooth, it will be turned through an angle of precisely 15°. The indexing mechanism will thereby produce twenty-four equal steps of movement per revolution of the disc. If the disc 183 is advanced two teeth at a time, it will be turned through an angle of 30° and twelve equal steps of 30° each will be provided for each revolution of the disc. Similarly, an advance of three teeth will result in a 45° movement of the disc and result in eight steps of movement per revolution. In a like manner, four teeth will provide six steps per revolution; six teeth will give four steps per revolution; eight teeth will give three steps per revolution, and twelve teeth will result in two steps per revolution.

As mentioned earlier, the precision with which indexing is effected by the instant mechanism is determined by the spacing between corresponding surfaces formed on the teeth 184. For this reason, each tooth is provided with a finished surface 179 on one side thereof and the spacing between the surfaces 179 is held to a suitable small tolerance, such as .001 of an inch, in the manufacture of the disc 183.

The extent to which the disc is advanced on each operation of the indexing mechanism is determined by the position of a screw stud 185 which may be screwed into any one of a plurality of tapped holes 186 provided in a stop plate 187 (Fig. 6). Suitable numerals 188 (Figs. 1 and 6) are inscribed on the plate adjacent each hole 186 to indicate the number of steps of movement per revolution of the disc when the screw stud is placed in that particular hole.

The stop plate 187 is provided with a large central aperture 189 which fits over a cylindrical boss 190 (Fig. 2) machined on the frame casting 180. The stop plate is held in place on the boss 190 by a flange 191 formed on one end of a pinion sleeve 192. This sleeve is journaled in bearings 193 which are received in a cylindrical bore provided in the frame casting 180. The sleeve 192 is provided with gear teeth 194 which mesh with the teeth of rack piston 182 as shown in Fig. 2. Journaled within the sleeve 192 by means of bearings 195 is a shaft 196 which, at its forward end, is provided with a flange 197 and a tenon 198. The indexing disc 183 is provided with a center hole which fits over the tenon 198 and the disc is held against the flange 197 by screws 199.

The flange 191 on the pinion sleeve 192 carries a block 204 (Fig. 1) which overlies the peripheral surface of the indexing disc 183. A driving pawl 205 is pivotally supported on the block 204 by means of a screw 206. The pawl is urged into engagement with the teeth 184 by a spring pressed plunger 207 mounted in the block 204. The block is provided with an abutment face 208 which is adapted to engage the screw stud 185 and thereby rock the stop plate 187 counterclockwise against the bias of a spring 209 at the end of the cocking stroke of the mechanism. Counterclockwise movement of the plate 187 is limited by a stop screw 210 on the frame casting which lies in the path of a shoulder 211 formed on the stop plate. The plate is provided with a second shoulder 212 (Figs. 1 and 6) which is adapted to engage against a frame stud 213 on which a pair of pawls 214 and 215 are pivoted. The shoulder 212 thus limits clockwise rotation of the stop plate under the influence of spring 209.

The pawl 214 (Fig. 3) is a holding pawl which prevents counterclockwise rotation of the indexing disc when the driving pawl 205 ratchets over the teeth 184 on the counterclockwise or cocking stroke of the mechanism. The pawl 215 (Fig. 4) is a positioning pawl which stops the disc 183 at the end of the clockwise or indexing stroke. The end of the pawl 215 is held snugly against the finished surface 179 of a tooth on the disc by the hydraulic pressure acting on the rack piston 182 which urges the driving pawl 205 clockwise as viewed in Fig. 1 so as to press the surface 179 against the end of pawl 215 at the end of the indexing stroke. Thereby the disc 183 is held against inadvertent movement, with the finished surface 179 engaging against the end of the pawl 215, at all times except during the indexing cycle.

The pawls 214 and 215 are urged into engagement with the teeth of the disc by springs 216. The pawl 215 lies partly over the disk 183 and partly over a mask 217 (Fig. 5) which is secured to the flange 191 of the pinion sleeve 192 (Fig. 2). The mask is provided with a cam notch 218 (Fig. 4) which cooperates with a sloping face 219 on the pawl 215 and thereby lifts the pawl out of the teeth of the disc when the pinion sleeve 192 is rotated counterclockwise on the cocking stroke. The pawl is held disengaged by the peripheral surface of the mask 217 until near the end of the clockwise indexing stroke when the pawl again enters the cam notch 218 and stops further clockwise rotation of the indexing disc.

Secured to the rear end of the shaft 196 (Fig. 2) is a gear 224 which meshes with a smaller gear 225 formed on the end of a sleeve 226 which is journaled in a bore in the frame casting 180 by bearings 227. Mounted for rotation within the sleeve 226 is a drive shaft 228 to which is keyed a knurled knob 229. The end of the shaft adjacent the knob is tapped to receive a screw 230 which, when tightened, presses a washer 231 against the bottom of a counterbore formed in the end of the knob. The other end of the shaft 228 is provided with a flange 232 which bears against the bottom of a counterbore provided in the gear 225. Thereby, when the screw 230 is tightened, the knob 229 and sleeve 226 are clamped together and caused to rotate as a unit by reason of frictional engagement between the right hand end of the knob and the left hand end of the sleeve. Thus, rotation of the gear 225 by gear 224 will cause rotation of the drive shaft 228. However, by loosening the screw 230 it is possible to rotate the shaft 228 independently of the gears 224 and 225 and thus adjust the angular position of the drive shaft 228 with reference to the disc 183.

Associated with the indexing mechanism are three limit switches 5LS, 6LS, and 7LS which are supported on a mounting plate 235 secured to bosses 236 (Fig. 5) formed on the frame casting 180. The limit switch 5LS is disposed with its operating plunger overlying the pawl 215 as shown in Figs. 4 and 5. Thus, when the pinion sleeve 192 is rotated counterclockwise on the cocking stroke, the mask 217 will lift the pawl 215 and hold the limit switch 5LS operated until the end of the clockwise indexing stroke when the pawl reenters the notch in the mask. The limit switch 6LS is positioned in alignment with the stop plate 187 with its plunger received in a camming notch 238 (Fig. 6) formed in the plate. Hence, when the plate is rotated counterclockwise at the end of the cocking stroke by the screw stud 185, the cam surface of the notch will momentarily operate the switch 6LS. The limit switch 7LS is located above a single lobe cam 239 (Fig. 5) secured to the face of the gear 224. The cam is effective to hold the switch operated when the indexing mechanism is in its home position. When the indexing mechanism is operated on the first indexing cycle, the limit switch 7LS will be released by the cam 239 and will not again be operated until the indexing disc has completed one revolution and returned to its starting position.

The indexing mechanism heretofore described operates in the following manner. When the rock piston 182 is moved to the right as viewed in Fig. 1, the drive pawl 205 will be rotated counterclockwise and ratchet over the teeth 184 of the indexing disc 183. The disc will be held against counterclockwise rotation by the holding pawl 214 (Fig. 3) and the positioning pawl 215 (Fig. 4) will be cammed out of engagement with the teeth by the mask 217. When the abutment face 208 on the block 204 contacts the screw stud 185, the stop plate 187 will be rocked counterclockwise to move the shoulder 211 into engagement with the screw stud 210. Further rotation of the driving pawl 205 is thereby prevented and a signal is provided by the limit 6LS to return the rack piston 182 toward the left as viewed in Fig. 1. On the return stroke of the piston the driving pawl 205 will return the disc 183 clockwise until the pawl approaches the position shown in Fig. 1 when the notch 218 in the mask will permit the positioning pawl 215 to drop into engagement with a tooth on the indexing disc and thereby positively stop the disc and hold it in the position shown in Fig. 1.

Reciprocation of the rack piston 182 is controlled by a valve 245 (Fig. 7) having a plunger 246 which is operated by a solenoid 6SOL. Hydraulic pressure for operating the piston is supplied by a motor driven pump 247 which withdraws hydraulic fluid from a reservoir 248 and delivers it to a pressure line 249. Pressure in the line 249 is maintained substantially constant by a relief valve 250 which is connected to the line 249 and arranged to discharge excess fluid into the reservoir 248.

The valve 245 is provided with a central pressure port to which the line 249 is connected as shown in Fig. 7. The valve is also provided with a pair of exhaust ports which are connected by a return line 251 with the reservoir 248. When the solenoid 6SOL is deenergized, a spring 252 maintains the plunger 246 in the position shown in Fig. 7. In this position of the plunger the pressure line 249 is communicatively connected with the right hand end of the rack piston by a motor line 253. Hence, the piston is held in its left hand position as shown in Figs. 1 and 7 by hydraulic pressure applied against the right hand end of the piston. When solenoid 6SOL is energized, the plunger 246 is moved to the left thereby connecting the pressure line 249 with a motor line 254 which is connected to the left hand end of the cylinder 181. At the same time, the line 253 will be connected with the return line 251 so as to permit fluid contained in the right hand end of the cylinder to be returned to reservoir. Accordingly, the rack piston 182 will be moved to the right to the extent permitted by the screw stud 185 carried by the stop plate 187. The cocking stroke of the indexing mechanism is thereby effected. When the limit switch 6LS is operated by the stop plate at the end of the cocking stroke, the solenoid 6SOL will be deenergized thereby returning the valve to the position shown in Fig. 7 and causing the rack piston 182 to be returned to its left hand position. The driving pawl 205 will thereby return to its starting position and in so doing will rotate the indexing disc clockwise to the extent determined by the position of the screw stud 185.

The electrical control circuit for the solenoid 6SOL is shown in Fig. 7. Energizing current is supplied to the circuit by a line transformer 260, the secondary winding of which is connected to conductors 261 and 262. One terminal of the solenoid winding is connected by a conductor 263 to the conductor 262 while the other terminal of the solenoid is connected by a conductor 264 and normally open relay contacts 6CR with the conductor 261.

To initiate an indexing cycle, a push button 265 is adapted, when depressed, to complete a circuit through a control relay 6CR to thereby energize the relay and close its contacts in conductor 264 to thereby energize the solenoid 6SOL. At the same time, a relay 24CR is adapted to be energized through normally closed contacts 6LS of the limit switch 6LS heretofore described. Hence, the relay contacts 24CR will be closed around the push button 265 to thereby maintain the relay 6CR energized when the push button is released.

At the end of the cocking stroke the limit switch 6LS will be operated thereby opening its contacts shown in the wiring diagram so as to deenergize the relay 24CR. The holding contacts of the relay will thereby open and, since the push button 265 is now released, the circuit to relay 6CR will be broken and the relay will be deenergized. Accordingly, the contacts 6CR of the relay in the line 264 will open and deenergize 6SOL thereby permitting the plunger 246 of valve 245 to return to the position shown in Fig. 7. As previously described, this will cause the rack piston 182 to be returned to the left to its starting position thereby effecting the clockwise or indexing stroke of the indexing mechanism.

Alhough not required for the present application of the indexing mechanism, the limit switch 5LS is useful in connection with automatic control of the indexing mechanism in those types of applications where it is desired to tie in the operation of the mechanism with an automatic machine cycle. Similarly, the limit switch 7LS is useful for signaling the completion of one revolution of movement of the indexing device. The indexing mechanism may be utilized to drive and position any desired type of mechanism and, in the present instance, is shown in Fig. 7 with its drive shaft 228 connected to a "fine" synchro differential transmitter 270 which is connected through reduction gearing 272 with a "coarse" synchro differential transmitter 271. These transmitters are, of course, connected in a two speed synchro control system of a known type so as to effect indexing movements of a device operated by a servo motor each time the differential transmitters 270 and 271 are rotated through a predetermined angle by the drive shaft 228 of the indexing mechanism.

While, in the foregoing specification there has been set forth a specific structure in considerable detail for the purpose of illustrating a particular embodiment of the invention, it will be understood that such details of structure may be varied by those skilled in the art without departing from the spirit of the invention.

What is claimed is:

1. In an indexing device for providing equal steps of movement of a rotatable element, the combination of an indexing disc operatively connected to said element, a series of equally spaced teeth distributed around the periphery of said disc, means to support said disc for rotation about its central axis, a drive member journaled for rotation about said central axis, actuating means for rotating said member in one direction to cock the indexing device and in the opposite direction to effect indexing movement of said rotatable element, a driving pawl carried by said member and cooperating with the teeth on said indexing disc, said pawl being adapted to ratchet idly over the teeth on the cocking stroke and to engage with the teeth and drive said disc on the indexing stroke, a stop plate journaled for rotation about said central axis, means to limit the rotation of said plate about said axis to a predetermined arc, abutment means on said plate, abutment means on said drive member for engaging the abutment means on said plate near the end of the cocking stroke to rotate said plate to the extent permitted by said limiting means, and means rendered effective by the rotation of said stop plate for reversing said actuating means whereby said driving pawl will engage with the teeth on the indexing disc and give the rotatable element one step of movement.

2. The indexing device of claim 1 including means for returning said stop plate to its initial position when released by said abutment means at the start of the indexing stroke.

3. The indexing device of claim 2 including a positioning pawl, means to urge said pawl into engagement with the teeth on said indexing disc to thereby hold said disc against rotation by said actuating means in said opposite direction, and a mask moving with said driving member for lifting said positioning pawl out of said teeth at the beginning of the cocking stroke and holding it removed therefrom until the end of the indexing stroke.

4. The indexing device of claim 1 wherein one of said abutment means is selectively adjustable to different positions relative to the other abutment means to thereby enable the extent of advance of said rotatable element on each indexing movement of said disc to be varied by increments corresponding to the spacing between teeth on said disc.

References Cited in the file of this patent

UNITED STATES PATENTS

| | | |
|---|---|---|
| 1,165,092 | Grunow | Dec. 21, 1915 |
| 2,754,700 | Benjamin | July 17, 1956 |
| 2,848,909 | Hill | Aug. 26, 1958 |